United States Patent
Montesalvo et al.

(10) Patent No.: US 11,603,144 B2
(45) Date of Patent: Mar. 14, 2023

(54) CARAVAN

(71) Applicant: PATRIOT CAMPERS HOLDINGS PTY LTD., Molendinar (AU)

(72) Inventors: Justin Montesalvo, Meadowbrook (AU); Bradley Cullen, Molendinar (AU); Simon Pearce, Molendinar (AU); Harrison Bell, Molendinar (AU); Jack Beet, Molendinar (AU); Kirby James Nankivell, Molendinar (AU)

(73) Assignee: PATRIOT CAMPERS HOLDINGS PTY LTD., Molendinar (AU)

( * ) Notice: Subject to any disclaimer, the term of this patent is extended or adjusted under 35 U.S.C. 154(b) by 0 days.

(21) Appl. No.: 16/889,847

(22) Filed: Jun. 2, 2020

(65) Prior Publication Data
US 2020/0385069 A1 Dec. 10, 2020

(30) Foreign Application Priority Data
Jun. 6, 2019 (AU) .................................. 2019901959

(51) Int. Cl.
*B62D 35/00* (2006.01)
*B60P 3/39* (2006.01)
*B60R 5/04* (2006.01)

(52) U.S. Cl.
CPC .............. *B62D 35/002* (2013.01); *B60P 3/39* (2013.01); *B60R 5/041* (2013.01)

(58) Field of Classification Search
CPC .......... B62D 35/002; B60P 3/39; B60R 5/041
USPC .............. 296/180.1, 193.08, 163, 164, 180.4
See application file for complete search history.

(56) References Cited

U.S. PATENT DOCUMENTS

| 512,273 | A | * | 1/1894 | Brown | |
|---|---|---|---|---|---|
| 4,362,258 | A | * | 12/1982 | French | B60P 3/34 296/160 |
| 6,286,894 | B1 | * | 9/2001 | Kingham | B62D 35/001 105/1.1 |
| 7,699,382 | B2 | * | 4/2010 | Roush | B60J 5/062 296/186.3 |
| 8,550,540 | B1 | * | 10/2013 | Pacholyk | B62D 35/001 296/180.4 |
| 9,573,542 | B2 | * | 2/2017 | Kaneko | B60R 19/18 |
| 2006/0158000 | A1 | * | 7/2006 | Warlick, III | B60R 9/065 296/37.1 |
| 2010/0163330 | A1 | * | 7/2010 | Halliday | F41H 7/044 180/295 |

FOREIGN PATENT DOCUMENTS

| CN | 204367974 U | 6/2015 | |
|---|---|---|---|
| CN | 208665039 U | 3/2019 | |
| EP | 0989054 A2 * | 3/2000 | ........... B62D 35/002 |
| WO | WO-9312953 A1 * | 7/1993 | ........... B62D 35/002 |

OTHER PUBLICATIONS

Chinese Office Action for Chinese Application No. 202020967564. 3, dated Nov. 25, 2020, 2 pages.

* cited by examiner

*Primary Examiner* — Joseph D. Pape
(74) *Attorney, Agent, or Firm* — Tucker Ellis LLP

(57) ABSTRACT

The present application relates to a caravan. The caravan includes a chassis and a body for being carried by the chassis and defining a tapering tail. The tapering tail provides for improved rear clearance and maneuverability when backing into tight spaces. The caravan includes one or more storage modules for being releasably fastenable to the body.

15 Claims, 2 Drawing Sheets

CARAVAN

RELATED APPLICATION DATA

This application claims priority to AU 2019901959, filed Jun. 6, 2019, which is hereby incorporated herein by reference.

TECHNICAL FIELD

The present invention relates to a caravan.

BACKGROUND

The reference to any prior art in this specification is not, and should not be taken as an acknowledgement or any form of suggestion that the prior art forms part of the common general knowledge.

A caravan is towed behind a road vehicle to provide a place to sleep which is comfortable and protected. It provides a means for people to have their own home on a journey or a vacation, without relying on a motel or hotel, and enables them to stay in places where none is available.

Caravans vary from basic models which may be little more than a tent on wheels to those containing several rooms with all the furniture and furnishings and equipment of a home. Some caravans include foldable trailer tents.

In practice, caravans are often required to be backed into tight spaces which can be difficult owing to their size. The preferred embodiment provides for improved clearance and maneuverability over known caravans.

Storage room in caravans is often at a premium and some items can be difficult to store in remaining spaces. The preferred embodiment provides for improved storage of difficult items.

SUMMARY OF THE INVENTION

According to one aspect of the present invention, there is provided a caravan including:
 a chassis; and
 a body for being carried by the chassis and defining a tapering tail.

Advantageously, the tapering tail provides for improved rear clearance and maneuverability when backing into tight spaces.

The body may define an aerodynamic shape to mitigate wind drag when being towed. The body may include one or more sidewalls with an aerodynamic shape.

The sidewalls may include a pair of tapering front panels, substantially parallel intermediate panels extending from the front panels, and the tapering tail extending from the intermediate panels. The tapering tail may include tapering rear panels. The front panels may be shorter than the rear panels. The front panels may taper at a greater rate then the rear panels.

The caravan may further include one or more storage modules for being releasably fastenable to the body. Advantageously, the storage modules can vary in configuration (e.g. shape, size, internal configuration etc.) to suit the storage needs of the caravanner thereby providing for improved storage of otherwise difficult-to-store items. The storage modules may be interchangeable, and releasably fastened to the rear of the body for ease of accessibility when on the road.

The caravan may further include storage boxes borne by the chassis adjacent the body. The caravan may further include an retractable cover for covering a living or bedding space. The retractable cover may be located above the storage boxes. The expandable cover may include a nose cone, and a retractable roof. The cover may taper toward the front of the caravan to reduce drag during towing.

According to one aspect of the present invention, there is provided a caravan including:
 a chassis;
 a body for being carried by the chassis; and
 one or more storage modules for being releasably fastenable to the body.

According to another aspect of the present invention, there is provided a storage module for a caravan, the storage module being configured to be releasably fastenable to a body carried by a chassis of the caravan.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
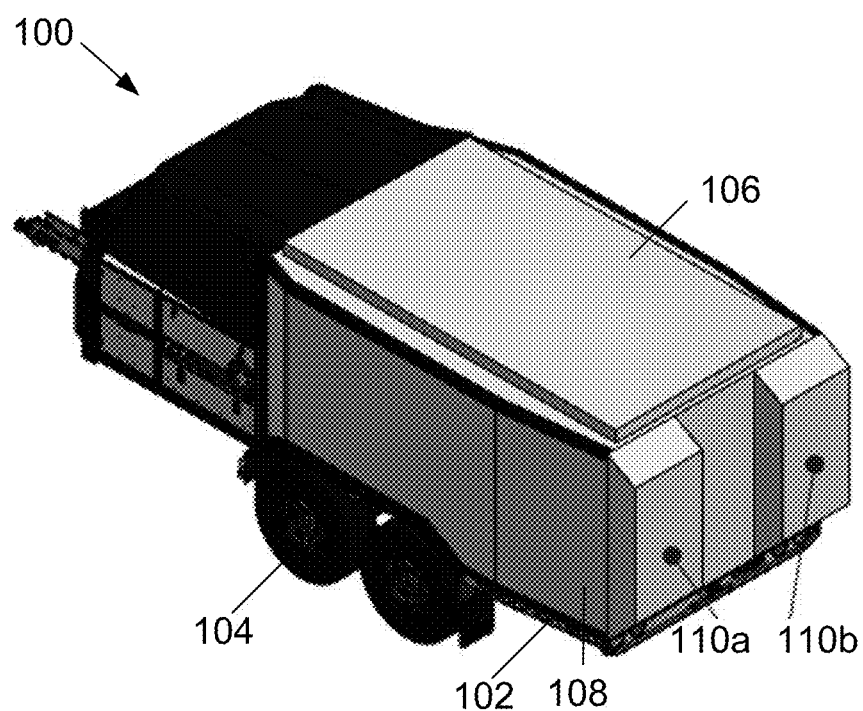
FIG. 1 is a rear perspective view of a modular caravan in accordance with an embodiment of the present invention.

According to an embodiment of the present invention, there is provided a modular caravan 100 as shown in FIG. 1. The caravan 100, with model no. C610, includes a lower chassis 102 with four wheels 104. Further, the caravan 100 includes a living space body 106 for being carried by the chassis 102 and defining a tapering tail 108. Advantageously, the tapering tail 108 provides for improved rear clearance and maneuverability than conventional caravans. Such benefits arise not only when backing into tight spaces, but a decrease in the wall to wall clearance also assists when performing any turns regardless of direction of travel or circumstance.

The caravan 100 further includes a pair of storage modules 110a, 110b for being releasably fastenable to the body 106. Advantageously, the storage modules 110a, 110b can vary in configuration (e.g. shape, size, internal configuration etc.) to suit the storage needs of the caravanner thereby providing for improved storage of otherwise difficult-to-store items.

The two storage modules 110a, 110b are interchangeable, and releasably fastened to the rear of the body 106 for ease of accessibility when on the road with a packed caravan 100. The modules 110 can be purchased as accessories, at a separate point of sale than the caravan 100, and later retro-fitted. Each module 110 can be shipped to the caravanner for installation, along with suitable mounting means.

Figure 2:
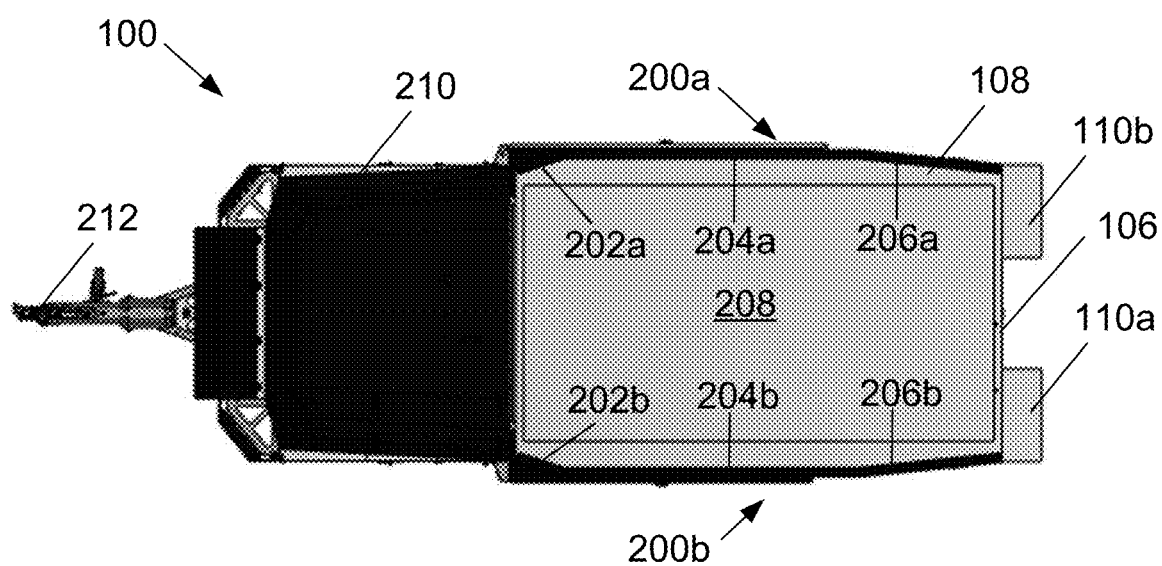
FIG. 2 is a plan view of the caravan of FIG. 1.

As can best be seen in FIG. 2, the bulky living-space body 106 defines an aerodynamic shape, with aerodynamic upright sidewalls 200a, 200b, to mitigate wind drag when being towed.

The sidewalls 200a, 200b include a pair of front panels 202a, 202b tapering toward the front of the caravan 100. Further, the sidewalls 200a, 200b include substantially parallel intermediate panels 204a, 204b extending from the front panels 202a, 202b.

The tapering tail 108 extends from the intermediate panels 204a, 204b. The tapering tail 108 includes rear panels 206a, 206b tapering toward the rear of the caravan 100.

The front panels 202a, 202b are shorter than the rear panels 206a, 206b. The front panels 202a, 202b also taper at a greater rate than the rear panels 206a, 206b.

The caravan 100 also includes a retractable lid 208 on top of the body 106. As is shown in FIG. 2, the retractable lid 208 covers the body 106 and the tapering tail 108. The retractable lid 208 is moveable in a generally vertical direction between a retracted position (FIG. 1) and an extended position (FIG. 4) so as to vertically extend a living space defined by the body. The chassis 102, which tapers at its tail in line with the body 106, also includes a front storage platform 210. A towing-hitch 212 extends from the storage platform 210.

Figure 3:
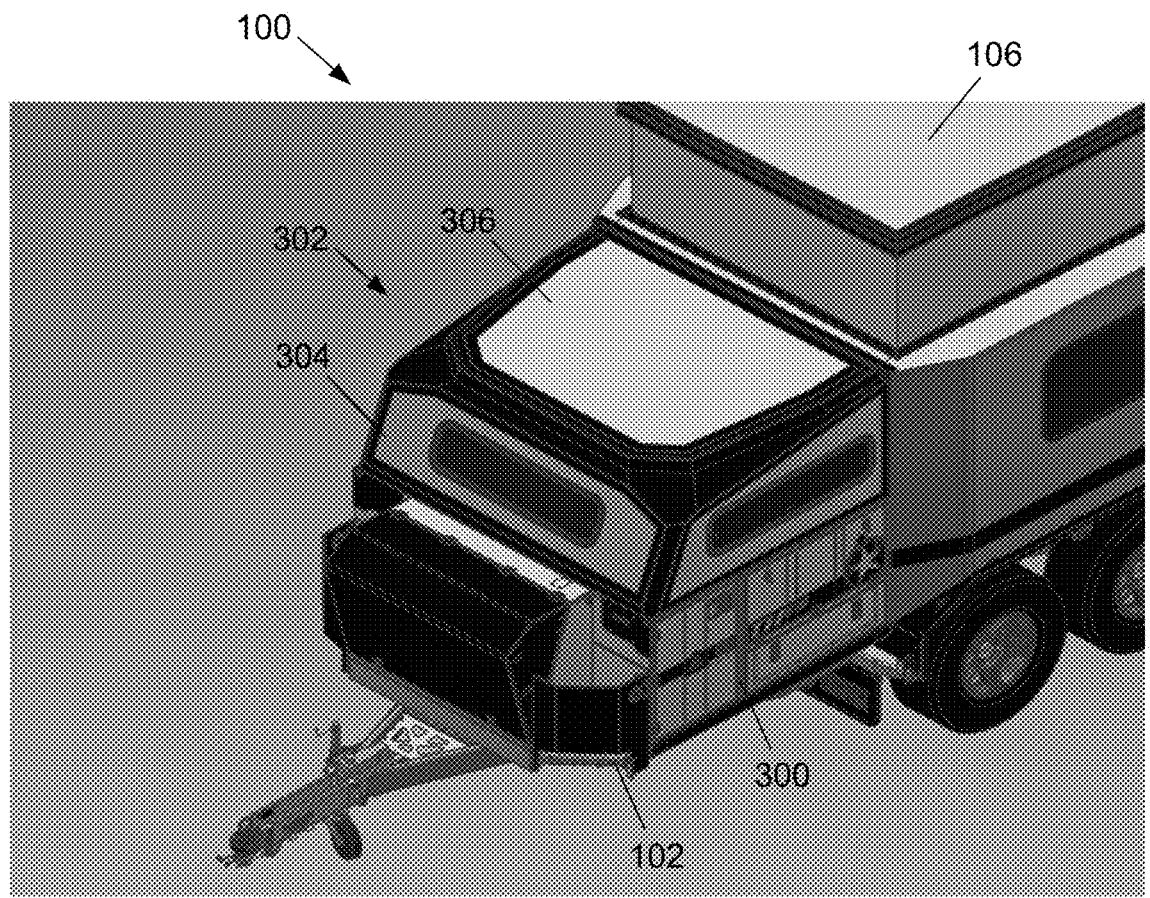
FIG. 3 is a partial front perspective view of the caravan of FIG. 1.

Turing to FIG. 3, the caravan 100 further includes storage boxes 300 borne by the chassis 102 adjacent the body 106. The caravan 100 further includes a front retractable cover 302 located above the storage boxes 300, and for covering a living or bedding space. The expandable cover 302 includes a rigid nose cone 304, and a retractable roof 306 atop the nose cone 304. The cover 302 fits within the confines of the sides of the body 106.

Figure 4:
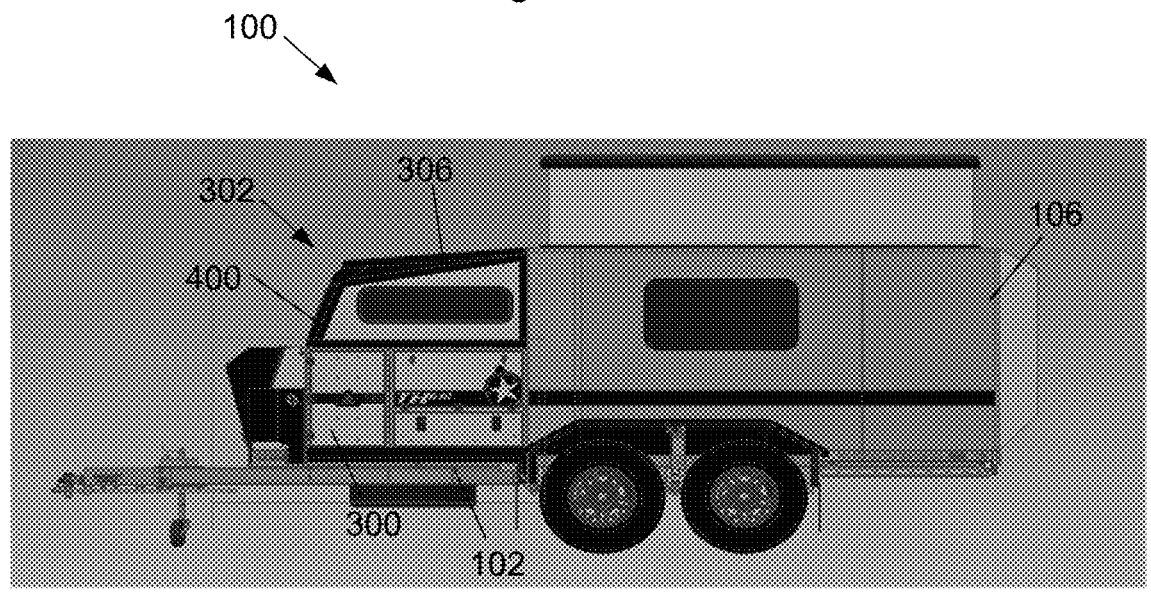
FIG. 4 is a side view of the caravan of FIG. 1.

As can best be seen in FIG. 4, the cover 302 tapers toward the front of the caravan 100 to reduce drag during towing, with both the front panel 400 and the roof 306 being angled.

A person skilled in the art will appreciate that many embodiments and variations can be made without departing from the ambit of the present invention.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention claimed is:

1. A caravan including:
 a chassis;
 a body for being carried by the chassis and defining a tapering tail;
 a retractable lid covering the body and the tapering tail, the retractable lid moveable in a generally vertical direction between a retracted position and an extended position so as to vertically extend a living space defined by the body;
 one or more storage compartments borne by the chassis adjacent the body; and
 a cover disposed above the one or more storage compartments and covering a living or bedding space of the caravan, said cover tapering toward a front end of the caravan and defining an angled front face and an angled roof.

2. A caravan as claimed in claim 1, wherein the tapering tail provides for improved rear clearance and maneuverability when backing into tight spaces.

3. A caravan as claimed in claim 1, wherein the body defines an aerodynamic shape to mitigate wind drag when being towed.

4. A caravan as claimed in claim 1, wherein the body includes one or more sidewalls with an aerodynamic shape.

5. A caravan as claimed in claim 4, wherein the sidewalls include a pair of tapering front panels, substantially parallel intermediate panels extending from the front panels, and the tapering tail extending from the intermediate panels.

6. A caravan as claimed in claim 5, wherein the tapering tail includes tapering rear panels.

7. A caravan as claimed in claim 6, wherein the front panels are shorter than the rear panels.

8. A caravan as claimed in claim 6, wherein the front panels taper at a greater rate then the rear panels.

9. A caravan as claimed in claim 1, further including one or more storage modules for being releasably fastenable to the body.

10. A caravan as claimed in claim 9, wherein the storage modules can vary in configuration, including shape, size and/or internal configuration, to suit the storage needs of the caravanner thereby providing for improved storage of otherwise difficult-to-store items.

11. A caravan as claimed in claim 9, wherein the storage modules are interchangeable, and releasably fastened to the rear of the body for ease of accessibility when on the road.

12. A caravan including:
 a chassis;
 a body for being carried by the chassis;
 one or more storage modules for being releasably fastenable to the body;
 a retractable lid covering the body and the tapering tail, the retractable lid moveable in a generally vertical direction between a retracted position and an extended position so as to vertically extend a living space defined by the body;
 one or more storage compartments borne by the chassis adjacent the body; and
 a cover disposed above the one or more storage compartments and covering a living or bedding space of the caravan, said cover tapering toward a front end of the caravan and defining an angled front face and an angled roof.

13. A caravan as claimed in claim 12, further comprising a plurality of storage modules, wherein the storage modules are interchangeable, and releasably fastened to a rear of the body for ease of accessibility when on the road.

14. A method for configuring a caravan, the caravan including a chassis, a body for being carried by the chassis, a retractable lid covering the body and the tapering tail, the retractable lid moveable in a generally vertical direction between a retracted position and an extended position so as to vertically extend a living space defined by the body, the method comprising releasably fastening one or more storage modules to the body; one or more storage compartments borne by the chassis adjacent the body; and a cover disposed above the one or more storage compartments and covering a living or bedding space of the caravan, said cover tapering toward a front end of the caravan and defining an angled front face and an angled roof.

15. A method as clamed in claim 14, further comprising varying in configuration the storage modules to suit the storage needs of the caravanner thereby providing for improved storage of otherwise difficult-to-store items.

\* \* \* \* \*